(12) United States Patent
Chakraborty

(10) Patent No.: US 8,230,224 B2
(45) Date of Patent: Jul. 24, 2012

(54) TRANSMITTING SECURITY DATA IN MULTIPART COMMUNICATIONS OVER A NETWORK

(75) Inventor: Anirban Chakraborty, Santa Clara, CA (US)

(73) Assignee: International Business Machines Corporation, Armonk, NY (US)

( * ) Notice: Subject to any disclaimer, the term of this patent is extended or adjusted under 35 U.S.C. 154(b) by 1212 days.

(21) Appl. No.: 11/073,616

(22) Filed: Mar. 8, 2005

(65) Prior Publication Data

US 2006/0206711 A1  Sep. 14, 2006

(51) Int. Cl.
*H04L 29/06* (2006.01)

(52) U.S. Cl. .................... 713/176; 713/160; 713/170

(58) Field of Classification Search .................. 713/176, 713/170, 160, 180–181; 709/201–203, 225
See application file for complete search history.

(56) References Cited

U.S. PATENT DOCUMENTS

| | | | |
|---|---|---|---|
| 5,659,616 A | 8/1997 | Sudia | |
| 5,875,296 A | 2/1999 | Shi et al. | |
| 6,055,637 A | 4/2000 | Hudson et al. | |
| 6,092,196 A | 7/2000 | Reiche | |
| 6,128,738 A | 10/2000 | Doyle et al. | |
| 6,373,950 B1 * | 4/2002 | Rowney | 380/255 |
| 6,681,328 B1 | 1/2004 | Harris et al. | |
| 6,748,528 B1 | 6/2004 | Greenfield | |
| 6,760,752 B1 | 7/2004 | Liu et al. | |
| 2003/0009476 A1 | 1/2003 | Fomenko et al. | |
| 2004/0054898 A1 | 3/2004 | Chao et al. | |
| 2004/0088348 A1 * | 5/2004 | Yeager et al. | 709/202 |
| 2004/0117262 A1 * | 6/2004 | Berger et al. | 705/16 |
| 2005/0144278 A1 * | 6/2005 | Atamaniouk | 709/225 |
| 2005/0172128 A1 * | 8/2005 | Little et al. | 713/168 |

OTHER PUBLICATIONS

Fielding et al., "Hypertext Transfer Protocol—HTTP/1.1", Jan. 1997, Network Working Group, RFC 2068, p. 149-150.*
Sachin Deshpande, Wenjun Zeng, "Scalable Streaming of JPEG2000 Images using Hypertext Transfer Protocol", Oct. 2001, ACM Digital Library, "Multimedia '01: Proceedings of the ninth ACM international conference on Multimedia", pp. 372-381.*
T. Harding, R. Drummond, C. Shih, "MIME-based Secure Peer-to-peer Business Data Interchange over the Internet", Sep. 2002, Network Working Group, RFC 3335, pp. 1-28.*
D. Moberg, R. Drummond, "MIME-based Secure Peer-to-peer Business Data Interchange using HTTP, Applicability Statement 2 (AS2)", Dec. 2004, IETF, pp. 1-44.*
Cheng Peng, Robert H. Deng, Yongdong Wu, "A Flexible and Scalable Authentication Scheme for JPEG2000 Image Codestreams", Nov. 2003, ACM, pp. 433-441.*
B. Ramsdell, "S/MIME Version 3 Message Specification", RFC 2633, Jun. 1999, Network Working Group, pp. 1-30.*

* cited by examiner

*Primary Examiner* — Edward Zee
*Assistant Examiner* — Chi Nguy
(74) *Attorney, Agent, or Firm* — Sughrue Mion, PLLC

(57) ABSTRACT

Embodiments of the invention provide for efficiently implementing security features over HTTP communications. In some embodiments, a security feature, such as a digital signature, can be efficiently implemented over HTTP communications. The HTTP communications are conducted in parts. The first part contains the payload data of the message. The second part, if appropriate, contains information for the digital signature, such as the digital signature itself or the result of a signature verification.

22 Claims, 6 Drawing Sheets

TRANSMITTING SECURITY DATA IN MULTIPART COMMUNICATIONS OVER A NETWORK

FIELD

Embodiments of the invention relate to methods and systems of securing data. In particular, embodiments of the invention relate to transmitting digital signatures of data.

BACKGROUND

Hypertext Transfer Protocol (HTTP) is an application-level protocol over Transfer Control Protocol (TCP) for distributed, collaborative hypermedia information systems. HTTP is one of the most prevalent protocols for transferring data over a network, such as the Internet.

HTTP is considered generic, stateless protocol. In particular, HTTP is a simple request/reply (RR) protocol over TCP. Each HTTP message that a client sends to a server must contain all necessary information for the server to process it. This is effectively "service in mass production" since each HTTP request can be treated as generic and on its own merit.

In general, HTTP works by creating a new transport connection for each request. Using HTTP, a client sends a request to a server over the connection. The server then replies over the same connection, sending information about the response, and followed if possible by the requested data. The standard procedure when an HTTP request is done is to close the TCP connection (no explicit closing of the HTTP connection is necessary).

One of the limitations of HTTP is that it requires creating a separate connection for each request. A single HTTP connection cannot be used for many different requests. Instead, as noted above, HTTP uses stateless connections that are unique to each transaction. Unfortunately, this makes it difficult to include various security features on HTTP communications.

For example, digital signatures can be difficult to employ over HTTP communications. Typically, digital signatures have become a prominent way to secure information and use what is known as "public key cryptography," which employs an algorithm using two different but mathematically related "keys;" one for creating a digital signature or transforming data into a seemingly unintelligible form, and another key for verifying a digital signature or returning a message to its original form. A digital signature is unique to both the message and the key used to create it.

Typically, a digital signature is attached to its message and stored or transmitted with its message. However, this requirement is difficult to employ in HTTP, because HTTP is a stateless protocol and does not provide a mechanism for including a security feature with a message. Since a digital signature should be unique to its message, it is useless if wholly disassociated from its message.

However, in view of the widespread acceptance of HTTP, Secure Sockets Layer (SSL) and S-HTTP have been developed to provide security for HTTP communications. SSL is a protocol that runs over HTTP and establishes a secure connection between two computers. S-HTTP is an extension of HTTP and is designed to send individual messages securely.

Unfortunately, HTTP, S-HTTP, and SSL are still not ideal for providing security features, such as digital signatures. Accordingly, it may be desirable to provide methods and systems for implementing security features with communications protocols, such as HTTP.

SUMMARY

In accordance with one feature of the invention, a computer program product is embodied on a computer readable medium. The computer program product may be for transmitting data and a security feature within a message having a plurality of parts. The message is transmitted over a connection-oriented protocol through a network. The computer program product may include program code for receiving a request for data and program code for determining a security feature for the data. In addition, the computer program product may include program code for transmitting a message in response to the request, wherein the message comprises a first part that contains the data and the second part contains the security feature.

In accordance with another feature of the invention, a computer program product is embodied on a computer readable medium. The computer program product may be for requesting data and a security feature associated with the data within a response that has been sent through a network. In particular, the computer program product may include program code for sending a request for data, for receiving a response to the request, and for determining when the response contains multiple parts. The requested data may be extracted from a first part of the multiple parts the requested data. A security feature that is associated with the requested data may also be extracted from a second part of the multiple parts.

In accordance with another feature of the invention, a server is configured to provide data and a security feature associated with the data. The server comprises a processor, and a memory, coupled to the processor, that stores program code for receiving a request for data, program code for determining a security feature for the data, and program code for transmitting a message in response to the request, wherein the message comprises a first part that contains the data and a second part contains the security feature.

Additional features of the invention will be set forth in part in the description which follows, and in part will be obvious from the description, or may be learned by practice of the invention. The features of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiments of the invention and together with the description, serve to explain the principles of the invention.

DESCRIPTION OF THE EMBODIMENTS

Embodiments of the invention provide methods and systems for efficiently implementing security features over HTTP communications. In some embodiments, security features, such as digital signatures, can be efficiently implemented over HTTP communications. The HTTP communications are conducted in parts. The first part contains the payload data of the message. The second part, if appropriate, contains information for the digital signature, such as the digital signature itself or the result of a signature verification.

Reference will now be made in detail to exemplary embodiments of the invention, which are illustrated in the accompanying drawings. Wherever possible, the same reference numbers will be used throughout the drawings to refer to the same or like parts. The present disclosure begins by providing an exemplary system and describing some of its components. The methods and processes for transmitting security features with a protocol, such as HTTP, will then be described. The present disclosure now begins with reference to FIG. 1.

Figure 1:
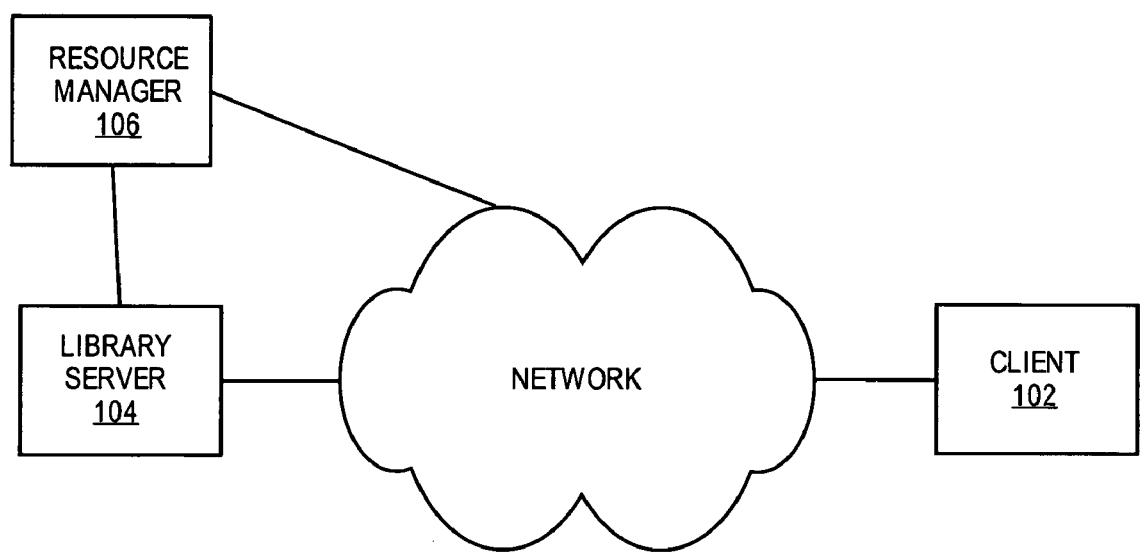
FIG. 1 shows a system that is consistent with the embodiments of the invention.

FIG. 1 shows a system 100 that is consistent with embodiments of the invention. For purposes of illustration, system 100 is configured as a system that delivers various types of content, such as documents, video files, audio files, and the like. However, one skilled in the art will recognize that embodiments of the invention can apply to virtually any type of system that utilizes HTTP communications.

Referring now back to the exemplary system shown in FIG. 1, system 100 may comprise a client 102, a library server 104, and a resource manager 106. These components may be coupled together using one or more networks, such as a local area network, or wide area network. In addition, these components may communicate with each other using known protocols, such as the transport control protocol and internet protocol ("TCP/IP") and HTTP.

The components of system 100 may be implemented on separate devices or may be implemented on one or more of the same devices or systems. For example, library server 102 and resource manager 104 may be installed on the same machine and run under a common operating system. Alternatively, system 100 may have one or more of its components implemented on multiple machines that run different operating systems. Some of the specific components of system 100 will now be described.

Client 102 provides a user interface for system 100. Client 102 may be implemented using a variety of devices and software. For example client 102 may be implemented on a personal computer, workstation, or terminal. In addition, client 102 may run under an operating system, such as the IBM z/OS operating system and AIX operating system, the Microsoft Windows operating system, the Sun Solaris operating system, and the like. Client 102 may also operate through an Internet browser application, such as Internet Explorer by Microsoft Corporation or Netscape Navigator by Netscape Communications Corporation. One skilled in the art will recognize that these browsers commonly support HTTP communications. Although FIG. 1 shows a single client, system 100 may include any number of clients.

Library server 104 stores, manages, and provides access control to items stored by system 100. Library server 104 processes requests, such as creates, reads, updates, and deletes, from client 102 and maintains the data integrity between the other components of system 100, such as resource manager 106. For example, library server 104 may work in conjunction with resource manager 106 to retrieve an object, such as a document or image file, that is referenced by an item.

Library server 104 may be implemented using a variety of devices and software. For example, library server 104 may be a computer that runs one or more application programs and stored procedures under an operating system, such as z/OS, Windows, AIX, or Solaris. In addition, library server 104 may include a database management system, such as a relational database management system, to manage stored items and perform searches for system 100. For example, library server 104 may use the DB2 Universal Database by International Business Machines Corporation.

Resource manager 106 stores objects corresponding to items in system 100. Objects may be any data entity for an item that is in digital form. For example, an object may be an audio file, an application, an image, text, or a video file. Resource manager 106 may store the objects in various formats, such as JPEG images, MP3 audio, AVI video, and ASCII text. Resource manager 106 may also store objects in formats, such as Microsoft Word, Lotus Word Pro, and Wordperfect.

Furthermore, resource manager 106 may also be configured to store multiple copies of objects on the same or a separate resource manager (not shown). Although FIG. 1 shows a single resource manager, system 100 may include any number of resource managers. For example, system 100 may include multiple resource managers that are distributed across one or networks.

In some embodiments, resource manager 106 may provide various data integrity and security features of the content being stored. For example, resource manager 106 may be configured to compute a digital signature of the data while it is stored. Resource manager 106 may use the various known algorithms, such as the secure hashing algorithm (SHA), MD5, and the like. Similarly, when handling retrieval requests for the stored content, resource manager 106, may perform a digital signature verification to check if the content has been tampered or corrupted. Resource manager 106 may then some or all of this information back to client 102.

In some embodiments, resource manager 106 is configured to transmit a digital signature or the result of a digital signature verification using HTTP communications with client 102. Of course one skilled in the art will recognize that resource manager 106 may use other protocols with the HTTP communications, such as S-HTTP and SSL.

Resource manager 106 may be implemented using known devices and software. For example, resource manager 106 may be installed on one or more computers that run under the z/OS operating system, and includes a DB2 Universal Database, as well as a server to communicate with client 102 and library server 104, such as an HTTP server. In addition, resource manager 106 may include one or more storage devices, such as a magnetic disc drive or optical disk drive.

Figure 2:
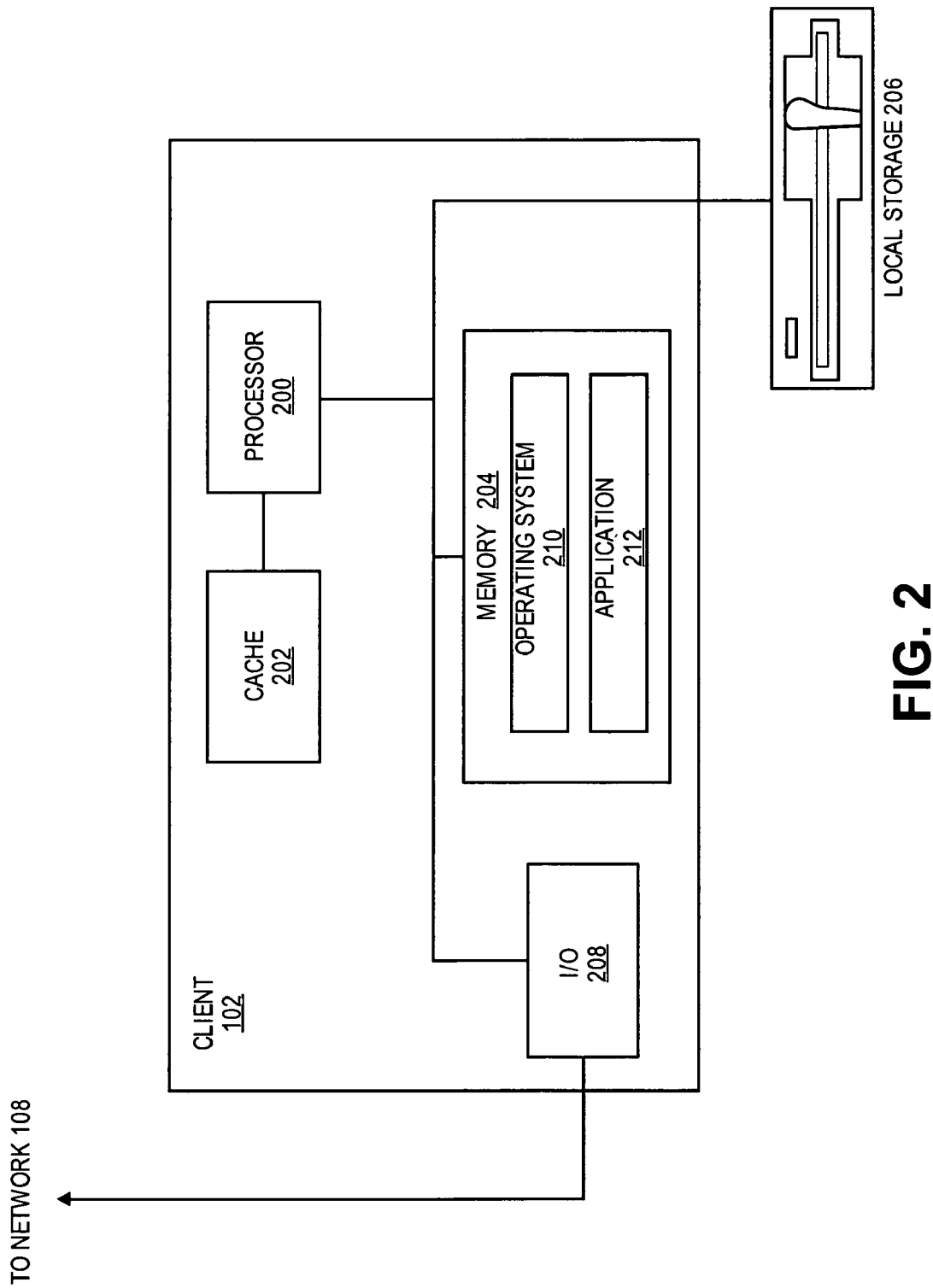
FIG. 2 shows a conceptual diagram of a client that is consistent with the embodiments of the invention.

FIG. 2 shows a conceptual diagram of client 102 that is consistent with embodiments of the invention. As shown, client 102 may include a central processor 200, a cache 202, a main memory 204, a local storage device 206, and an input/output controller 208. These components may be implemented based on hardware and software that is well known to those skilled in the art.

Processor 200 may include cache 202 for storing frequently accessed information. Cache 202 may be an "on-chip" cache or external cache. Client 102 may also be provided with additional peripheral devices, such as a keyboard, mouse, or printer (not shown). In the embodiment shown, the various components of client 102 communicate through a system bus or similar architecture.

Although FIG. 2 illustrates one example of the structure of client 102, the embodiments of the invention are applicable to other types of processors and systems. That is, embodiments of the invention may be applied to any type of processor or system that serves as a database platform. For example, client 102 may comprise multiple processors, such as those provided by the Intel Corporation, or may comprise multiple computers that are linked together.

Operating system (OS) 210 may be installed in memory 204, for example from local storage 206, and is an integrated collection of routines that service the sequencing and processing of programs and applications by client 102. OS 210 may provide many services for server 104, such as resource allocation, scheduling, input/output control, and data management. OS 210 may be predominantly software, but may also comprise partial or complete hardware implementations and firmware. Well-known examples of operating systems that are consistent with embodiments of the invention include the IBM z/OS operating system and AIX, the Microsoft Windows™ operating system, the Sun Solaris operating system, LINUX, and UNIX.

In addition, client 102 may run under an OS 210 an application 212, such as Microsoft Internet Explorer, Mozilla Firefox, or Netscape Navigator that communicate using HTTP. One skilled in the art will recognize that there many such applications that support HTTP can be installed on client 102.

Figure 3:
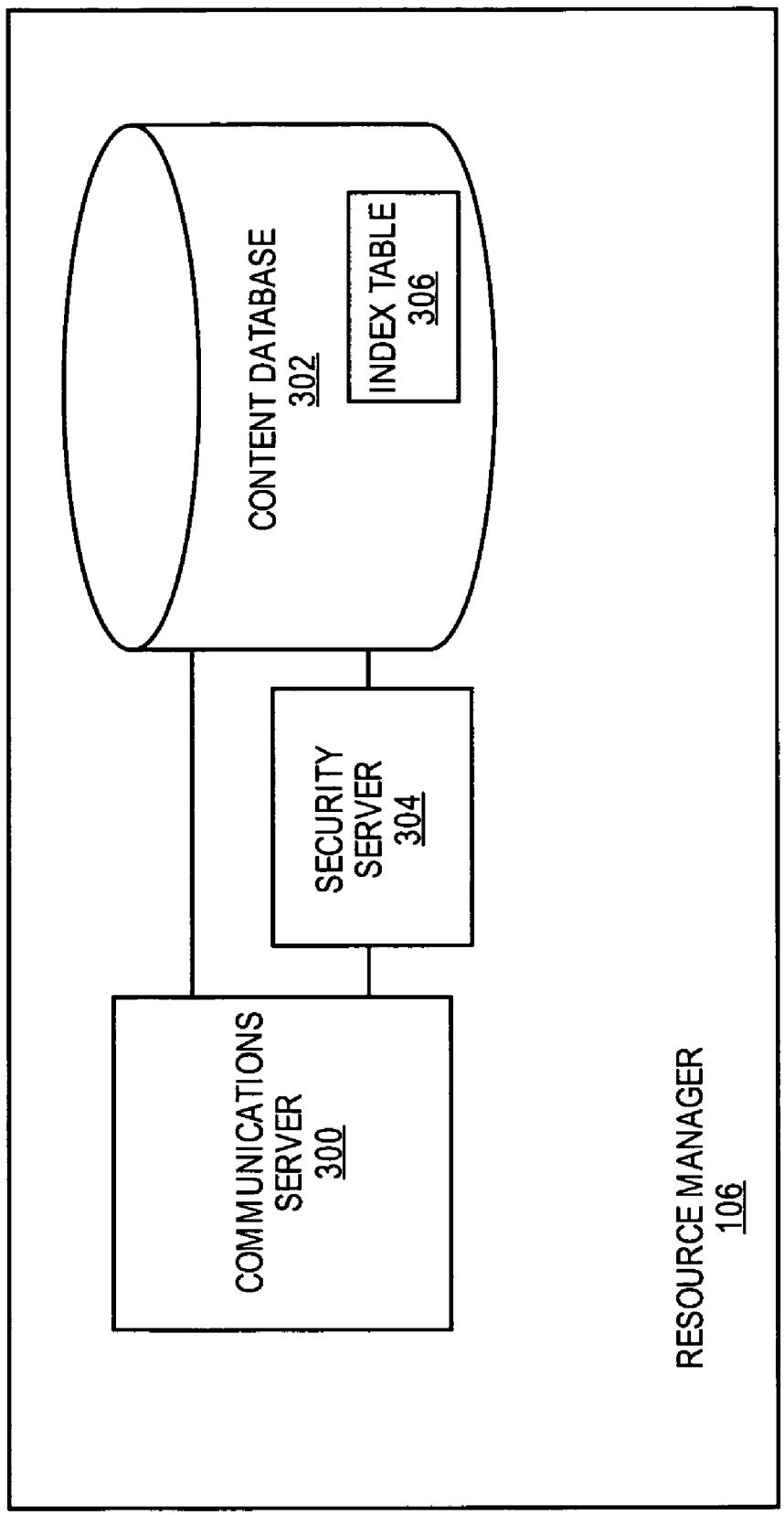
FIG. 3 shows a conceptual diagram of a resource manager that is consistent with embodiments of the invention.

FIG. 3 shows a conceptual diagram of resource manager 106 that is consistent with embodiments of the invention. As shown, resource manager 106 may comprise a communication server 300, a content database 302, and a security module 304.

Server 300 provides communication services between resource manager 106, client 102 and library server 104. In one embodiment, communication server 300 is implemented as an HTTP server that is configured to communicate with client 102 and library server 104. Server 300 may be implemented using well known components of hardware, software, firmware, or any combination thereof.

Content database 302 manages and stores objects for system 100. Content database 302 may be implemented using a variety devices and software. For example, in one embodiment content database 302 implemented as a relational database, such as DB2 Universal database. In addition, content database 302 may use a variety of types of storage, such as can drive optical storage units, or magnetic disk drive.

In addition, content database 302 may include one or more tables, such as a content index table 306. Content index table 306 may contain information that indexes the content corresponding to various items. For example, content index table 306 may index or reference objects, such as documents and image files, stored by resource manager 106.

Security module 304 is program code that provides the various security features for the content stored by resource manager 106. For example, security module 304 may determine a digital signature or verify the digital signature associated with a particular item based on the well known algorithms, such as SHA, MD5, etc. Security module 304 may be written in a variety of host programming languages, such as C, C++, Java, or COBOL. Security module 304 may be a separate application within resource manager 106, or may be embedded as a component of communications server 300.

For example, security module 304 may include a digital signature checker component that is written in a programming language, such as Java, or C++. The pseudo code of such a component is given below:

```
create HTTP response OutputStream object;
set HTTP response status = 206;
create a multipart_data_boundary=#$@%4545;
create the first body part, add data headers for this part and write to OutputStream;
initialize_signature_computation_module( );
while(read_from_data_store(data_buffer) >= 0) {
    Calculate_digital_digest_of_data(data_buffer);
    writeDataBufferToOutputStream(data_buffer);
}
get_digital_signature_from_digital_digest_of_data_just_computed( );
delimit the data part with the multipart_data_boundary;
create the second body part and set its data headers to OutputStream.
encode_digital_signature( );
write_encoded_signature_to_OutputStream( );
delimit this part with multipart boundary.
flush OutputStream;
```

Figure 5:
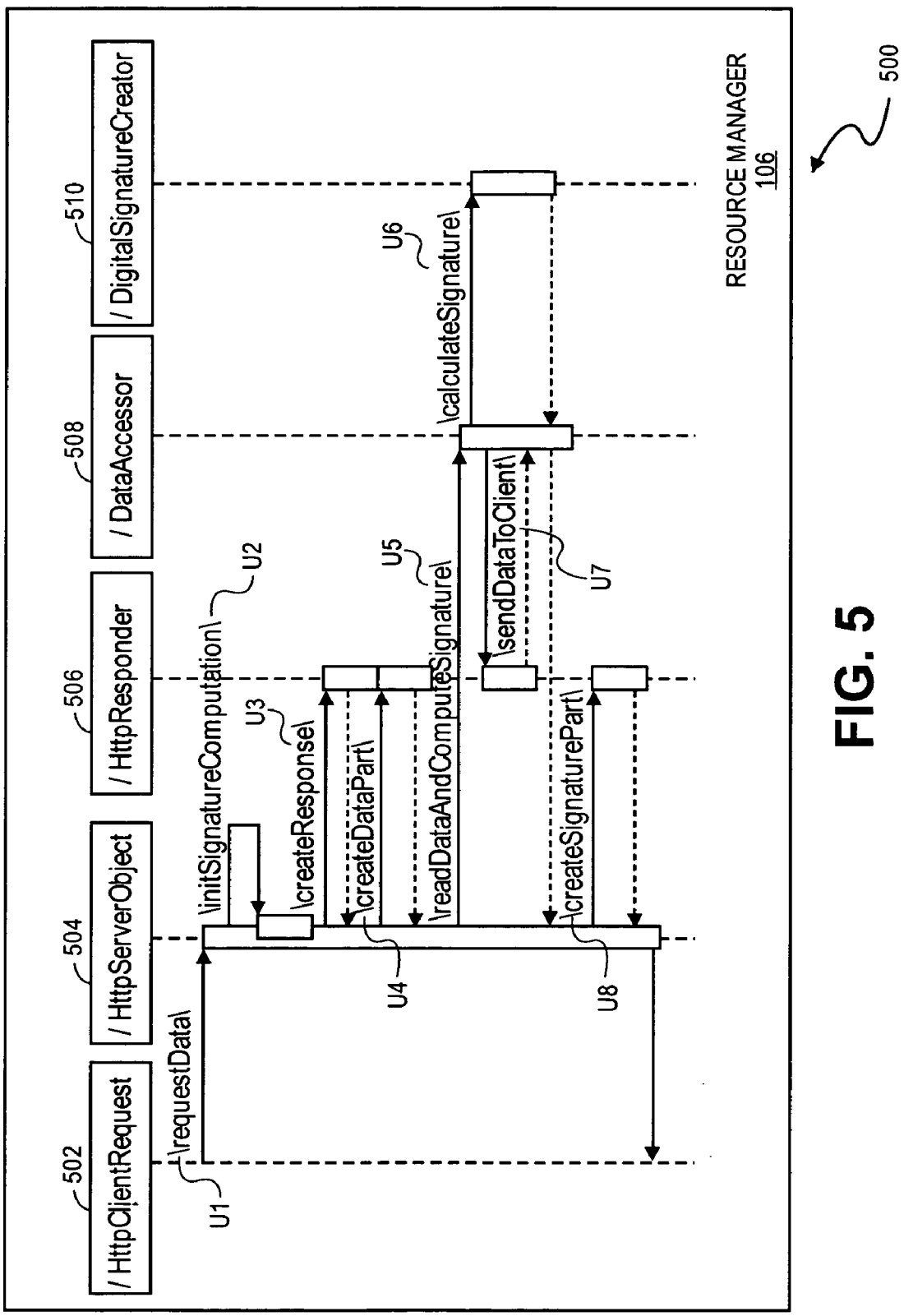
FIG. 5 provides a Unified Modeling Language (UML) sequence diagram that also illustrates the phases of processing by a server consistent with embodiments of the invention.

In addition, FIG. 5 provides a Unified Modeling Language (UML) sequence diagram that also illustrates the phases of processing by resource manager 106. Such a figure and its interpretation are well known to those skilled in the art. FIG. 5 will be further described below.

Now that some exemplary systems have been described, the present disclosure will now describe various processes and methods that are consistent with embodiments of the invention. Those skilled in the art will recognize that system 100 may use a connection-oriented protocol, such as HTTP, for its communications through a network. Those skilled in the art may also refer to HTTP as an application level protocol, a generic, stateless protocol, or a request/response protocol. For purposes of explanation, embodiments of the invention will be described based on HTTP communications.

Figure 4:
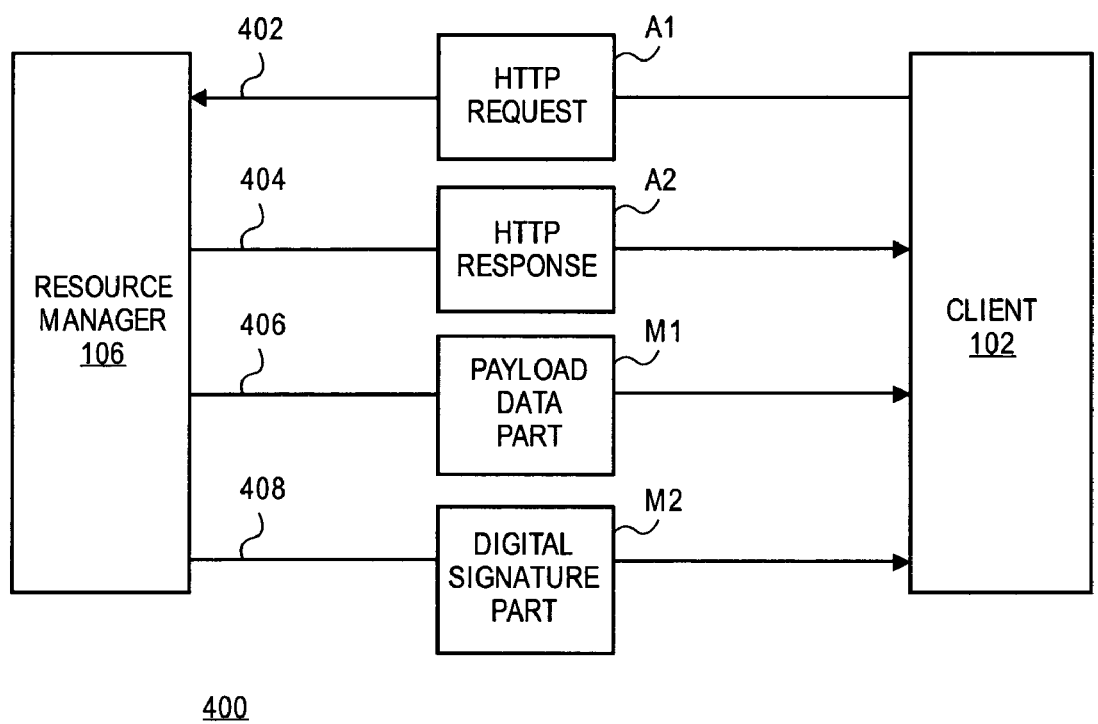
FIG. 4 shows a flow diagram of exemplary HTTP communications between a client and a server consistent with embodiments of the invention.

Referring now to FIG. 4, a process flow 400 is provided to illustrate exemplary HTTP communications between client 102 and resource manager 106. Process flow 400 may be implemented based on a computer program product that is embodied on a computer readable medium, such as a magnetic disk, optical disk, and the like. In some embodiments of the invention, resource manager 106 and client 102 may perform HTTP communications based on the known Internet standard "RFC 2616," entitled "Hypertext Transfer Protocol—HTTP/1.1," by R. Fielding et al., which is herein incorporated by reference.

In stage 402, client 102 sends an HTTP request A1, such as a HTTP GET request, for a data retrieve operation to an HTTP web server in resource manager 106.

In stage 404, resource manager 106 may then establish an HTTP connection with client 102. For example, resource manger 106 may transmit HTTP response A2. HTTP response A2 may be used to configure the HTTP connection and provides information that indicates the format of the one or more messages that resource manager 106 will use to respond to HTTP request A1. For example, HTTP response A2 may indicate information, such as a status line, version information, information about resource manager 106, and the like. In some embodiments, resource manager 106 may be configured to indicate that one or more security features will be incorporated in parts of its messages, such as a digital signature. For example, resource manager 106 may use the HTTP status code 206 in HTTP response A2 to indicate that partial content messages will be transmitted, i.e., messages that are transmitted in multiple parts. In some embodiments, HTTP response A2 notifies client 102 that the requested data will be received in multiple parts and that one of the parts will contain one or more security features. Of course, one skilled in the art will understand that other status codes or features of HTTP may be used consistent with embodiments of the invention. Processing by resource manager 106 may then flow to stage 406.

In stage 406, resource manager 106 retrieves the data requested in HTTP request A1, for example, on behalf of client 102. In addition, security module 304 may determine one or more security features. For example, a digital signature and/or a verification result of a digital signature are types of security features that are consistent with embodiments of the invention. Accordingly, resource manager 106 may initially respond with HTTP response A2 and follow up with one or more HTTP messages that comprise multiple parts. The first part M1 may contain the data retrieved from the underlying data in content database 302.

In stage 408, resource manager 106 may create a second part (or additional part) M2. As noted, part M2 may be configured to carry one or more security features that can be associated with part M1. Part M2 may contain various body headers, such as "Digital Signature Validation Result: fail/success." Alternatively, resource manager 106 may configure part M2 to include the actual digital signature of the data with proper encoding. Resource manager 106 may then transmit part M2 to client 102.

As will be described with reference to FIG. 6, at client 102, application 212 may identify the status code indicated in HTTP response A2. In some embodiments, the HTTP status code 206 for multipart/partial content messages may be used by embodiments of the invention. For example, when resource manager 106 has specified a status code 206 in HTTP response A2, application 212 may prepare its multipart response data handler. For example, application 212 may include a multipart range HTTP stream data parser. Application 212 may then extract the data and the data validation result out of the multipart HTTP response, i.e., from parts M1 and M2. If a digital signature was sent, that may be extracted out as well.

For purposes of illustration, below is an example of an HTTP request A1 that is consistent with embodiments of the invention.

```
Client Http Request:
    GET /cgi_servlet_path/filepath/filename HTTP/1.1<CR><LF>
    Accept: */* <CR><LF>
    Accept-Language: en-us<CR><LF>
    Connection: Keep-Alive<CR><LF>
    User-agent: ICM/8.3.1.0<CR><LF>
    Host: rm_host_name:port<CR><LF>
    Content-length=dddd<CR><LF>
    Content-type: mimetype<CR><LF>
    Order: retrieve<CR><LF>
    Version: 1<CR><LF>
    Item-id: some_id<CR><LF>
    Objname: XXXXX.XXXXX<CR><LF>
    Collection: default collection<CR><LF>
    <CR><LF>
```

Below are examples of HTTP response A2, part M1, and part M2 that are consistent with embodiments of the invention.

```
HTTP/1.1 206 Partial Content<CR><LF>
Content-type: multipart/byteranges;
boundary=--AD278@%!874594--<CR><LF>
-- AD278@%!874594--
Content-type: text/plain<CR><LF>
{Payload Data}
...
<CR><LF>
-- AD278@%!874594--
Content-type: text/plain<CR><LF>
Signature-validation-result: fail|success<CR><LF>
{Encoded bytes representing digital signature}<CR><LF>
```

Figure 6:
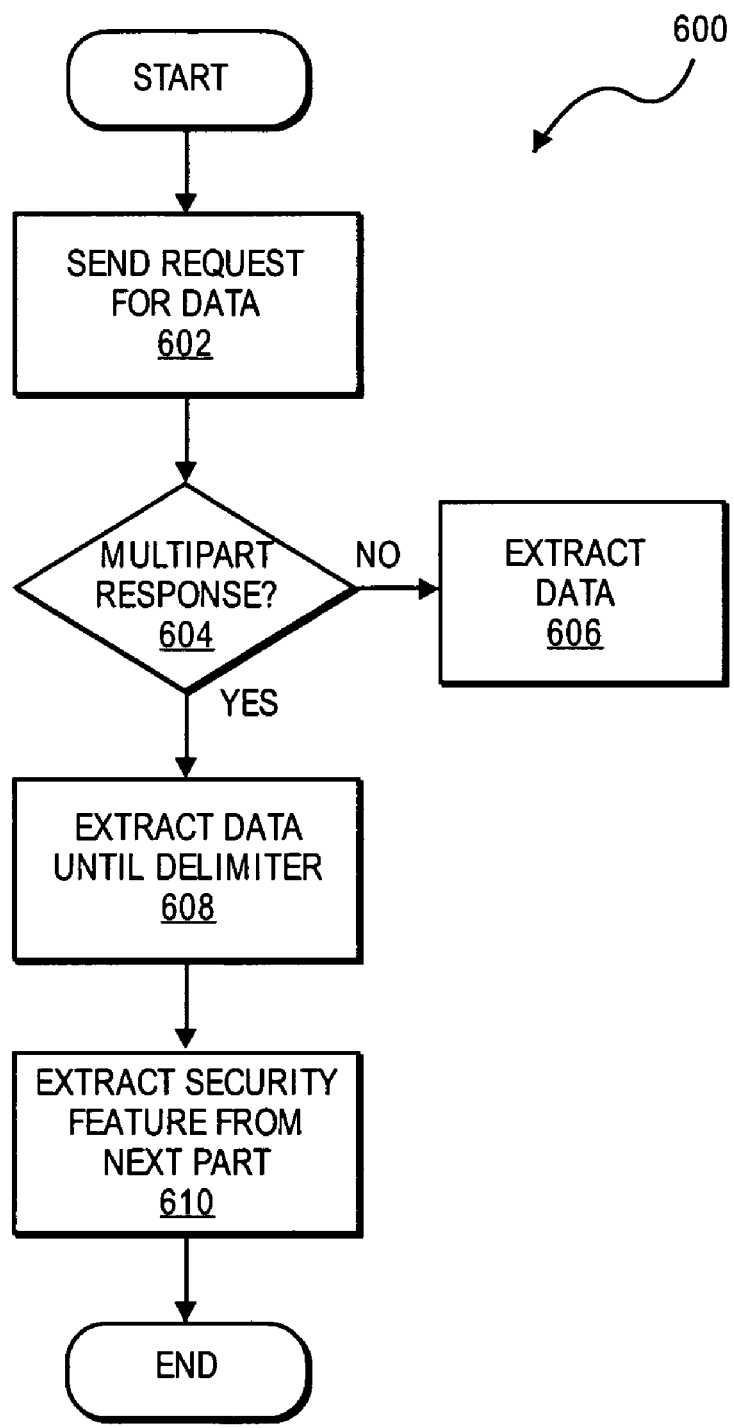
FIG. 6 illustrates an exemplary process flow that may be followed by a client consistent with embodiments of the invention.

For purposes of explanation, the present disclosure will now describe exemplary processing stages of resource manager 106 and client 102 with reference to FIGS. 5 and 6. FIG. 5 illustrates an exemplary process flow that may be followed by resource manager 106. In the example shown, resource manager 106 is configured to serve requested data using a connection-oriented protocol through a network, such as HTTP communications. In addition, in some embodiments of the invention, resource manager 106 is also configured to incorporate one or more security features into these HTTP communications. For example, resource manager 106 may use multipart HTTP messages (or partial content messages). One or more of the parts may be configured as normal HTTP communications for carrying the data requested. Moreover, one or more additional parts may be configured to carry a security feature, such as a digital signature of the data requested, to authenticate or protect the data. Accordingly, embodiments of the invention may provide an efficient mechanism for transmitting security data using an otherwise non-secured protocol, such as HTTP.

For convenience, FIG. 5 presents a process flow 500 in the form of a UML sequence diagram that may be implemented by resource manager 106. Process flow 500 may be implemented in resource manager 106 based on a computer program product that is embodied on a computer readable medium, such as a magnetic disk, optical disk, and the like. In addition, as noted, UML sequence diagrams and their interpretation are well known to those skilled in the art.

As shown, resource manager 106 may comprise an HttpClientRequest module 502, an HttpServerObject module 504, an HttpResponder module 506, a DataAccessor module 508, and a DigitalSignatureCreator module 510. These components may be implemented in program code that is based on well known programming languages, such as Java, or C++.

Upon receiving an HTTP request, such as HTTP request A1, HttpClientRequest module 502 may pass data requested in HTTP request A1 to HttpServerObject module 504 in the form of a "\requestData\" UML message U1. HttpServerObject module 504 may then perform initial computations for a security feature, such as a digital signature, and configure one or more messages or parts of messages for a response to HTTP request A1. For example, this information may include one or more encryption keys as well as formatting information for the various types of information requested in HTTP request A1. HttpServerObject module 504 may then format this information in a "\initSignatureComputation\" UML message U2.

HttpServerObject module 504 may send various UML messages to the other components of resource manager 106. For example, module 504 may send a "\createResponse\"UML message U3 and a "\createDataPart\" UML message U4 to HttpResponder module 506. Messages U3 and U4 may then trigger module 506 to retrieve and transmit the data requested in HTTP request A1. For example, HttpResponder module 506 may retrieve the data requested by HTTP request A1 from content database 302. In addition, module 506 may send a "\readDataAndComputeSignature\" UML message U5 to DataAccessor module 508. In turn, this may trigger module 508 to send a "\calculateSignature\" UML message U6 to DigitalSignatureCreator module 510. In response, module 510 may calculate a security feature, such as a digital signature, based on the data retrieved for HTTP request A1 and return this security feature to DataAccessor module 508. Module 508 may then forward the security feature information to HttpResponder module 506 in the form of a "\sendDataToClient\" UML message U7.

HttpServerObject 504 may then collect the data from HttpResponder module 506 and format one or more HTTP messages to respond to the HTTP request A1. For example, HttpServerObject module 504 and HttpResponder module 506 may operate in conjunction to create a multi-byte range HTTP message, i.e., a HTTP message having multiple parts. As noted above, in some embodiments, such a message may be specified by using an HTTP status code 206 to indicate a multipart/partial content HTTP message. In particular, HttpServerObject module 504 may send an HTTP message that comprises, for example, a first part M1 that carries the data requested. HttpServerObject module 504 may also send a second part M2 for a security feature that is associated with the data in part M1. For example, module 504 may send a "\createSignaturePart\" UML message U8 to HttpResponder module 506. In turn, module 506 may calculate a digital signature or verification result, based on the information received from DataAccessor module 508 and message U6. Module 504 may then transmit part M2 and complete the HTTP message. Of course, one skilled in the art will recognize that other methods and processes may be performed by resource manager 106 in accordance with embodiments of the invention.

FIG. 6 illustrates an exemplary process flow 600 that may be followed by client 102. Process flow 600 may be implemented in client 102 based on a computer program product that is embodied on a computer readable medium, such as a magnetic disk, optical disk, and the like. In stage 602, application 212 may send an HTTP request, such as HTTP request A1, for retrieving content data of a resource object stored by resource manager 106 in content database 302.

In stage 604, application 212 may determine whether a response, such as HTTP response A2, has been sent from resource manager 106 and if it includes a flag that indicates a multipart message will be sent by resource manager 106. As noted above, HTTP may provide various mechanisms for transferring data in messages having multiple parts. In some embodiments of the invention, one or more of the parts of an HTTP message may carry one or more security features. In some embodiments, application 212 conforms to the RFC 2616 standard for HTTP noted above. Accordingly, application 212 may interpret various HTTP status codes used by resource manager 106. As noted above, HTTP status code of 206 indicates that a partial content message was transmitted in multiple parts from resource manager 106. Accordingly, in some embodiments, the HTTP status code of 206 may cause application 212 to instantiate a multipart HTTP response data parser. Such parsers are known to those skilled in the art and, for example, may be implemented based on a well known programming language, such as Java or C++.

If HTTP response A2 from resource manager 106 did not include a multipart code (such as status code 206), the processing by application 212 may flow to stage 606. In stage 606, application 212 may proceed with normal HTTP processing that is known to those skilled in the art. However, if the HTTP response A2 includes a multipart code, such as status code 206, then processing by application 212 may flow to stage 608.

In stage 608, application 212 may extract out from HTTP response A2 multipart boundary delimiters, such as beginning and end delimiters, specified by resource manager 106 as the HTTP header content-type. In some embodiments, these delimiters may be a set of alphanumeric characters. Application 212 may then read data from part M1 that is delimited by the end delimiter set of characters. In some embodiments, this read operation by application 212 could be different for an object whose content length is known from that of a dynamically generated content (by resource manager 106).

Application 212 may then proceed to the next part of the HTTP message, i.e., part M2. In some embodiments, part M2 is configured to carry one or more security features that are associated with the data in part M1. For example, part M2 may include a digital signature of the data in part M1 or a verification result of a digital signature. Accordingly, application 212 read the data signature and/or the data computation validation result from part M2 of the messages sent in a HTTP response stream. Application 212 (or some other component of client 102) may then authenticate or verify the integrity of data in part M1 based on the security features in part M2.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A computer program product embodied on a non-transitory computer readable medium for transmitting data and a security feature within a message having a plurality of parts, wherein the message is transmitted over a connection-oriented protocol through a network, comprising:

program code for receiving a hypertext transport protocol GET request for data, wherein a first hypertext transport protocol response is transmitted in response to the hypertext transport protocol GET request;

program code for determining a security feature for the data including program code for determining a digital signature for the data;

program code for transmitting, subsequent to the first hypertext transport protocol response, the message in a second hypertext transport protocol response to the GET request, wherein the second hypertext transport protocol response comprises a first part that contains the data and a second part that contains the security feature, and wherein the first hypertext transport protocol response comprises information indicating that one of the plurality of parts of the second hypertext transport protocol response contains said security feature, wherein the security feature includes the digital signature for the data and a result of a validation of the digital signature.

2. The computer program product of claim 1, wherein program code for determining the security feature for the data comprises:
- program code for validating the digital signature for the data; and
- program code for determining nail the result of the validation of the digital signature.

3. The computer program product of claim 1, wherein program code for transmitting the message comprises program code for transmitting a multipart hypertext transport protocol message.

4. The computer program product of claim 1, wherein program code for transmitting the message comprises:
- program code for transmitting the first part that contains the data; and
- program code for transmitting, after the first part, the second part that contains the security feature.

5. The computer program product of claim 1,
- wherein the request is received from a client, and
- wherein the first hypertext transport protocol response is transmitted from a resource manager to the client, and
- wherein the resource manager works in conjunction with a library server to retrieve the data.

6. The computer program product of claim 5, wherein the first hypertext transport protocol response further comprises information about the resource manager.

7. The computer program product of claim 1, wherein the first hypertext transport protocol response comprises information indicating the format of the message in the second hypertext transport protocol response.

8. A computer program product embodied on a non-transitory computer readable medium for requesting data and a security feature associated with the data within a second hypertext transport protocol response that has been sent through a network, comprising:
- program code for sending a hypertext transport protocol GET request for the data, wherein a first hypertext transport protocol response is transmitted in response to the hypertext transport protocol GET request;
- program code for receiving the first hypertext transport protocol response to the GET request;
- program code for receiving, subsequent to the first hypertext transport protocol response, a message in the second hypertext transport protocol response to the GET request;
- program code for determining whether the second hypertext transport protocol response contains multiple parts;
- program code for determining whether the second hypertext transport protocol response contains a security feature includes program code for extracting a digital signature for the data;
- program code for extracting from a first part of the multiple parts the requested data; and
- program code for extracting from a second part of the multiple parts said security feature that is associated with the requested data,
- wherein the program code for determining whether the second hypertext transport protocol response contains said security feature comprises program code for identifying information in the first hypertext transport protocol response that indicates said security feature,
- wherein the security feature includes the digital signature for the data and a result of a validation of the digital signature.

9. The computer program product of claim 8, wherein the program code for determining whether the second hypertext transport protocol response contains multiple parts comprises program code for identifying a flag in a header of the first hypertext transport protocol response that indicates a multipart response.

10. The computer program product of claim 9, wherein the program code for determining whether the second hypertext transport protocol response contains multiple parts comprises program code for identifying a hypertext multipart byte range in the first hypertext transport protocol response.

11. The computer program product of claim 8, wherein the program code for extracting from the first part of the multiple parts the requested data comprises program code for extracting data from the first part until a set of delimiting codes is reached.

12. The computer program product of claim 8, wherein the program code for extracting the security feature from the second part of the multiple parts comprises program code for extracting the result that indicates flail the validation of a digital signature associated with the requested data.

13. The computer program product of claim 8,
- wherein the request is sent from a client, and
- wherein the first hypertext transport protocol response is transmitted from a resource manager to the client, and
- wherein the resource manager works in conjunction with a library server to retrieve data.

14. A server configured to provide data and a security feature associated with the data, said server comprising:
- a processor; and
- a memory, coupled to the processor, that stores program code for receiving a hypertext transport protocol GET request for data, wherein a first hypertext transport protocol response is transmitted in response to the hypertext transport protocol GET request, program code for determining a security feature for the data including program code for determining a digital signature for the data, and program code for transmitting, subsequent to the first hypertext transport protocol response, a message in a second hypertext transport protocol response to the GET request,
- wherein the second hypertext transport protocol response comprises a first part that contains the data and a second part that contains the security feature, and
- wherein the first hypertext transport protocol response comprises information indicating that one of a plurality of parts of the second hypertext transport protocol response contains said security feature,
- wherein the security feature includes the digital signature for the data and a result of a validation of the digital signature.

15. The server of claim 14, wherein the processor is configured by program code to format the message as said second hypertext transport protocol response having multiple parts.

16. The server of claim 14, wherein the processor is configured by program code to transmit the first part of the message before the second part of the message.

17. The server of claim 14, wherein the processor is configured by program code to transmit the digital signature in the second part of the message.

18. The server of claim 14, wherein the processor is configured by program code to transmit the result that indicates whether the digital signature is valid.

19. The server of claim 14, wherein the processor is configured by program code to format the message as a hypertext multipart byte range response.

20. The server of claim 14, wherein the processor is configured by program code to transmit at least one of the first and second parts over a secure hypertext transport protocol connection.

21. The server of claim 14, wherein the processor is configured by program code to transmit the message over a secure sockets layer connection.

22. The server of claim 14,
wherein the request is received from a client, and
wherein the first hypertext transport protocol response is transmitted from a resource manager to the client, and
wherein the resource manager works in conjunction with a library server to retrieve the data.

\* \* \* \* \*